United States Patent
Fu et al.

(10) Patent No.: US 7,763,565 B2
(45) Date of Patent: Jul. 27, 2010

(54) TRANSPARENT, STABLE TITANIUM DIOXIDE SOLS

(75) Inventors: Guoyi Fu, Ellicott City, MD (US);
BillieJo M. Monk, Glen Rock, PA (US);
Robert McIntyre, Highfields (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 151 days.

(21) Appl. No.: 11/848,967

(22) Filed: Aug. 31, 2007

(65) Prior Publication Data

US 2009/0062111 A1  Mar. 5, 2009

(51) Int. Cl.
| | |
|---|---|
| B01J 23/00 | (2006.01) |
| B01J 13/00 | (2006.01) |
| C01G 25/02 | (2006.01) |
| C01G 27/02 | (2006.01) |
| C01G 23/04 | (2006.01) |
| C01G 23/047 | (2006.01) |
| C09K 3/00 | (2006.01) |
| B01D 21/01 | (2006.01) |
| C08J 3/02 | (2006.01) |

(52) U.S. Cl. ............... 502/350; 423/608; 423/609; 423/610; 423/611; 423/612; 423/613; 423/614; 423/615; 423/616; 516/90; 516/99; 516/922

(58) Field of Classification Search ........... 502/350; 423/608–616; 516/90, 99, 922
See application file for complete search history.

(56) References Cited

U.S. PATENT DOCUMENTS

| | | | |
|---|---|---|---|
| 2,819,177 A * | 1/1958 | Conn et al. ............. 106/447 |
| 4,317,778 A | 3/1982 | Blum et al. | |
| 4,351,773 A | 9/1982 | Milberger et al. | |
| 4,374,043 A | 2/1983 | Blum et al. | |
| 5,049,309 A * | 9/1991 | Sakamoto et al. ......... 516/90 |
| 5,403,513 A * | 4/1995 | Sato et al. ............... 516/90 |
| 5,698,205 A * | 12/1997 | Bruckner et al. ......... 424/401 |
| 5,840,111 A * | 11/1998 | Wiederhoft et al. ...... 106/436 |
| 6,420,437 B1 | 7/2002 | Mori et al. | |
| 6,576,589 B1 * | 6/2003 | Na et al. ................ 502/350 |
| 6,602,918 B1 * | 8/2003 | Ichinose ................ 516/90 |
| 6,627,336 B1 | 9/2003 | Ohmori et al. | |
| 6,653,356 B2 * | 11/2003 | Sherman ................ 516/90 |
| 6,737,485 B1 | 5/2004 | St. Clair et al. | |
| 6,824,826 B1 | 11/2004 | Amadelli et al. | |
| 7,326,399 B2 * | 2/2008 | Zhou et al. ............. 423/610 |
| 2003/0167878 A1 * | 9/2003 | Al-Salim et al. .......... 75/711 |
| 2004/0241502 A1 * | 12/2004 | Chung et al. ............. 428/702 |
| 2005/0265918 A1 * | 12/2005 | Liu .................... 423/610 |

OTHER PUBLICATIONS

U.S. Appl. No. 12/031,425, Fu.

* cited by examiner

Primary Examiner—Patricia L Hailey
(74) Attorney, Agent, or Firm—Dunlap Codding, P.C.

(57) ABSTRACT

A method of preparing stable, transparent photocatalytic titanium dioxide sols is disclosed which involves thermal treatment of a suspension of amorphous titanium dioxide in the presence of certain alpha-hydroxy acids. The sots comprise titanium dioxide particles in the anatase form having a crystallite size less than about 10 nm and exhibit excellent stability and transparency at basic, neutral, and acid pH.

25 Claims, 1 Drawing Sheet

Photocatalytic (UV light) NO$_x$ Reduction of Sol Films on Concrete

TRANSPARENT, STABLE TITANIUM DIOXIDE SOLS

FIELD OF INVENTION

The present invention relates generally to compositions for imparting a photocatalytic coating on a surface. More specifically, the invention relates to sols of titanium dioxide nanoparticles which are useful for providing transparent photocatalytic coatings on a substrate which are de-polluting and/or self-cleaning.

BACKGROUND OF THE INVENTION

The photocatalytic properties of the semiconductor material titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade $NO_x$ and volatile organic compounds (VOCs) in the air. In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

In many applications, it is desirable for the titanium dioxide coating to be transparent in order to maintain the original appearance of the substrate (e.g., ceramic tile, paving block, siding, etc.) or its original transparency (e.g., window glass, car windshield, etc.). Titanium dioxide colloidal sols have proven to be a useful precursor material for forming such transparent coatings.

For example, U.S. Pat. No. 6,420,437 to Mori et al, which is hereby incorporated by reference, discloses a neutral titanium dioxide colloid sol said to have high stability in a neutral range and which is capable of forming a colorless transparent coating even when dried at room temperature. The sol is produced by mixing an acid titanium dioxide sol comprising 50 to 100 parts by weight of titanium dioxide colloidal particles and 5 to 50 parts by weight of a chelating agent for titanium ions with 1 to 50 parts by weight of an alkaline substance comprising at least one of alkali metal compounds and amine compounds, and optionally by adjusting the pH value of the liquid mixture to 5 to 10, or adjusting the pH value of the liquid mixture to 6 to 10, and then applying a deionization treatment to the mixture to thereby charge the titanium dioxide colloidal particles with negative electricity.

U.S. Pat. No. 6,627,336 to Ohmori et al., the disclosure of which is hereby incorporated by reference, describes an aqueous dispersion of titanium oxide particles, which are preferably predominantly comprised of brookite titanium oxide particles, comprising chloride ion, and a Brønsted base other than chloride ion, preferably nitrate ion and/or phosphate ion. The aqueous titanium oxide dispersion is prepared by hydrolyzed titanium tetrachloride in the presence of at least one kind of a Brønsted acid. Thin films formed from the aqueous titanium oxide dispersion are said to exhibit good photocatalytic activity, transparency and adhesion to a base material.

U.S. Pat. No. 6,824,826 to Amadelli et al., the disclosure of which is hereby incorporated by reference, relates to the use of photocatalytic preparations of colloidal titanium dioxide optionally doped with a metal chosen from groups I-VA, and the lanthanide and actinide series of the periodic table, for preserving the original appearance of cementitious, stone, and marble products. Preparation of colloidal titanium dioxide by the controlled hydrolysis of titanium isopropoxide with nitric acid is provided in Example 1 of that patent.

U.S. Patent Pub. 2004/0241502 to Chung, Hoon et al., the disclosure of which is hereby incorporated by reference, relates to a method of manufacturing a neutral and transparent titanium dioxide colloid solution wherein titanium dioxide nano particles are dispersed, and a titanium dioxide colloid solution prepared by the method. In one method for preparing the sols, a titanium compound and a stabilizer are added to alcohol, neutralized by adding a basic solution, and then heated at a temperature of above 75° C. for more than 7 hours. The titanium compound can be, among others, tetraisopropanol titanium (titanium isopropoxide) and among the numerous stabilizers, glycolic acid is said to be suitable. The neutral titanium dioxide colloid solution prepared by the method are said to be stable and transparent.

Despite these advances in the art, there is considerable room for improvement as each of the known sols is not without its disadvantages. It is therefore an object of the invention to provide sols comprising photocatalytic titanium dioxide which are transparent. It is also and object of the invention to provide such transparent titanium dioxide sols which are stable over an extended period of time. It is a further object of the invention to provide novel methods for preparing such stable, transparent sols which are readily implemented on a commercial scale.

The foregoing discussion is presented solely to provide a better understanding of nature of the problems confronting the art and should not be construed in any way as an admission as to prior art nor should the citation of any reference herein be construed as an admission that such reference constitutes "prior art" to the instant application.

SUMMARY OF THE INVENTION

In accordance with the foregoing objectives and others, it has surprisingly been found that titanium dioxide sols, which are both stable and transparent, are formed by thermal treatment of a suspension of amorphous titanium dioxide in the presence of certain alpha-hydroxy acids.

In one aspect of the invention, a method for preparing a stable, transparent photocatalytic titanium dioxide sol is provided, comprising: (i) providing a solution comprising a titanium containing compound, for example, a titanium alkoxide, titanium oxychloride, titanyl sulfate, or titanyl acetylacetonate; (ii) precipitating hydrous titanium dioxide from said solution of a titanium containing compound; (iii) forming an aqueous dispersion of the precipitated hydrous titanium dioxide; and (iv) mixing the aqueous dispersion in the presence of one or more alpha-hydroxy carboxylic acids, for example, lactic acid, tartaric acid, malic acid, citric acid, and combinations thereof, at a temperature between about 70° C. and about 150° C. for a period of time between about three hours and about 3 days. While it is required that the one or more alpha-hydroxy carboxylic acids be present during the thermal treatment step, it will be understood that they can be introduced during any of steps (i)-(iv). In one variant of the inventive method, the thermal treatment is advantageously carried out without a prior neutralization step. In another variant, the one or more alpha-hydroxy carboxylic acids will not include glycolic acid.

The resulting sol of titanium dioxide is surprisingly stable and transparent over a wide range of pH values, for example, throughout the pH range of 2 to 12. The sol will typically comprise crystallites of titanium dioxide having an average particle size of less than about 10 nm, or between about 1 nm and about 10 nm, the majority of the crystallites being in anatase form. In one variant, the crystallites have an average particle size between about 1 nm and about 5 nm and/or at least 90% of the crystallites are in the anatase form.

These and other aspects of the present invention will be better understood by reference to the following detailed description and accompanying figures.

DETAILED DESCRIPTION

Figure 1:
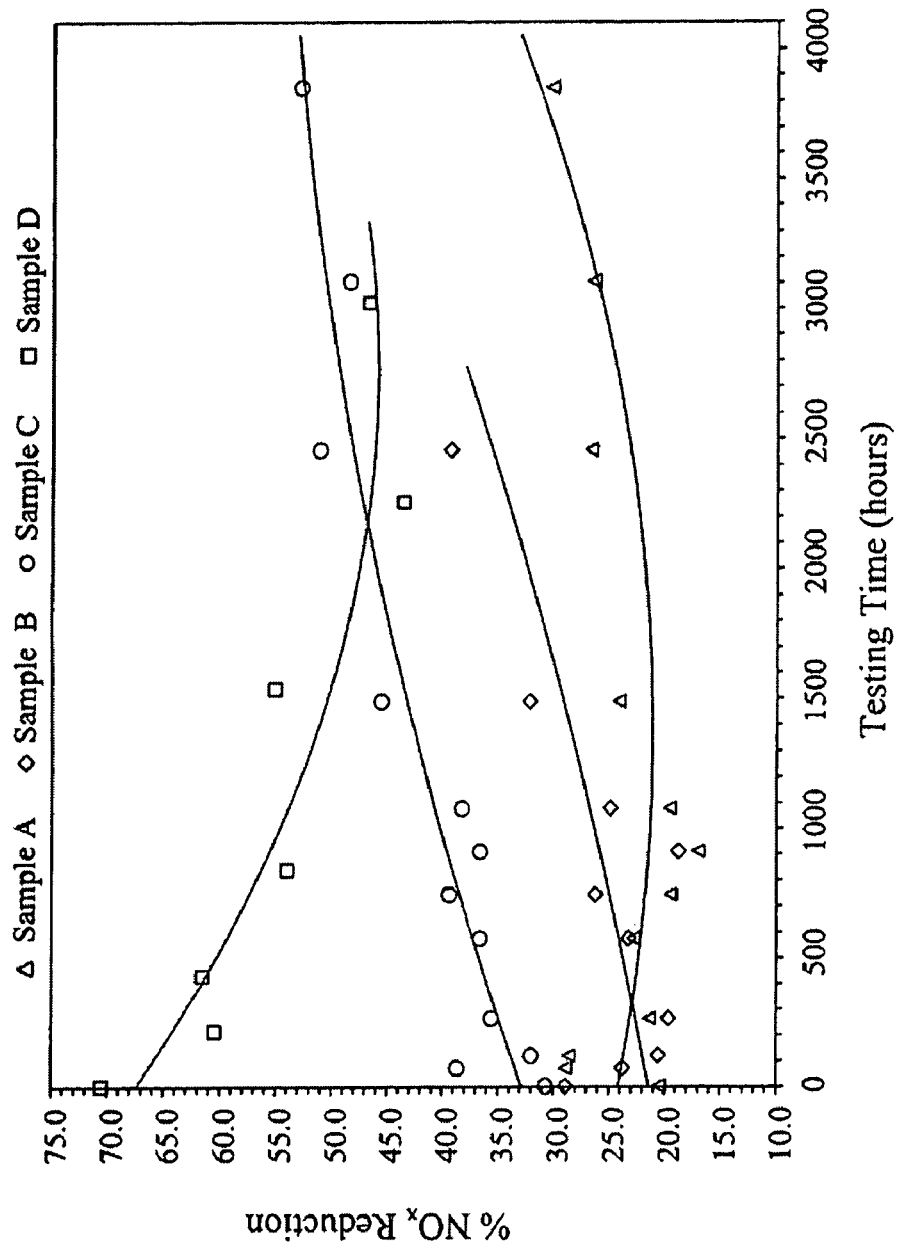
FIG. 1 compares the photocatalytic activity against NOx pollutants over time for four coatings designated Sample A-D formed from the sols of Examples 2, 4, 5, and 8, respectively.

All terms used herein are intended to have their ordinary meaning unless otherwise provided. The term "sol" refers to a colloidal suspension of particles. The term "$NO_x$" refers to the species NO (nitrogen oxide) and $NO_2$ (nitrogen dioxide), either collectively or individually.

Where reference is made to "removal" of pollutants from the air, it will be understood to include complete or partial removal of pollutants from the air. Whether removal is "substantial" can be determined by the methods provided in the examples, where "substantial" removal refers to reduction in the total concentration of a fixed amount of given pollutant by at least about 5%, preferably at least about 10%, and more preferably at least about 15%.

The method for preparing stable, transparent sols of colloidal photocatalytic titanium dioxide according to the invention generally comprises: (1) providing a solution of a titanium containing compound; (2) precipitating amorphous hydrous titanium dioxide from the solution; (3) dispersing the precipitated titanium dioxide in water and mixing with a peptizing agent at a temperature between about 70° C. and about 150° C. for a period of time between about three hours and about 3 days; wherein the peptizing agent comprises an alpha-hydroxy carboxylic acid; thereby providing a stable, transparent sol comprising nanoparticles of anatase titanium dioxide having a particle size less than or equal to about 10 nanometers (nm) in diameter, and preferably less than or equal to about 5 nm in diameter.

The titanium containing compound may be any compound capable of forming a precipitate of titanium dioxide, including without limitation, a titanium alkoxide, titanium oxychloride, titanyl sulfate, titanyl acetylacetonate, and the like. Suitable titanium alkoxides include, without limitation, titanium ethoxide, titanium n-propoxide, titanium isopropoxide, titanium tert-butoxide, and titanium n-butoxide, to name a few. Mixed alkoxides are also contemplated to be suitable. Titanium isopropoxide is a currently preferred titanium containing compound according to the invention due in part to its low cost and relative ease of hydrolysis.

The solution of the titanium containing compound may be an aqueous solution or may comprise a suitable organic solvent such as an alcohol, for example, ethanol or iso-propanol. There is essentially no constraint on the concentration of the solution of the titanium containing compound, although it is preferably suitably concentrated such that the kenetics of the precipitation are optimized. Precipitation may be affected by any suitable method, including without limitation, hydrolysis, pH adjustment, or solvent-shifting. The precipitation method employed will be determined largely by the selection of titanium containing compound. For example, hydrolysis is the preferred precipitation method where the titanium containing compound is a titanium alkoxide or titanium acetylacetonate. For titanium oxychlorides or titanyl sulfates, which are water soluble, precipitation is best carried out by pH adjustment (e.g., raising the pH) or by adding a solvent in which the compound is essentially insoluble, such as acetone or higher alcohols ("solvent shifting"). By "essentially insoluble" is meant that the solubility of the titanium containing compound is sufficiently low in the solvent to permit titanium dioxide to precipitate from solution when contacted with the second solvent. By "higher" alcohols is meant $C_5$ alcohols or greater, including, without limitation, pentanol, hexanol, heptanol, octanol, etc.

The amorphous hydrous titanium dioxide precipitate is typically collected by filtration and thoroughly washed with de-ionized water prior to re-dispersion. The washed, wet filter cake is then re-dispersed in a volume of de-ionized water with vigorous agitation (e.g., stirring with a deep vortex, shaking, etc.). The deionized water will usually, though not always, comprise a peptizing agent in solution before the dispersion is formed. Since the benefit of the peptizing agent is largely realized during the subsequent thermal treatment step, it is not strictly necessary that the peptizing agent be present in the aqueous solution before the precipitate is re-dispersed. Rather, the peptizing agent can also be added after the dispersion is formed, or may be added to the titanium precursor before the precipitation is carried out. The amount of de-ionized water used will preferably be such that the weight ratio of the initial titanium containing compound (e.g. titanium isopropoxide) to the total weight of the dispersion is from about 1:2 to about 1:10, more typically, about 1:3 to about 1:6, and preferably about 1:4 to about 1:5.

The peptizing agent is ideally an organic acid (e.g., a carboxylic acid) which will preferably have a first dissociation constant $pK_{a1} \leq 3.5$ at 25° C. The preferred peptizing agents according to one embodiment are alpha-hydroxy carboxylic acids. Suitable alpha-hydroxy carboxylic acids will typically comprise one, two, or three carboxylic acid groups, and include, without limitation, lactic acid, malic acid, tartaric acid, and citric acid, to name a few. In some embodiments, salts of the foregoing acids are also contemplated to be suitable. Combinations of the foregoing acids are also contemplated to be useful. In one embodiment, the solution will be free of or essentially free of glycolic acid, as this alpha-hydroxy acid has a $pK_{a1}$ of 3.83 at 25° C. and is thus not preferred in the practice of the invention. By "essentially free of" is meant that glycolic acid collectively comprise no more than 5% of the total weight of peptizing agent, preferably less than about 2.5% by weight, and more preferred still, less than about 1% by weight. The amount of peptizing agent required will typically range from about 0.1 to about 0.5 moles per mole of $TiO_2$ precipitate. Without wishing to be bound by any particular theory, it is believed that the peptizing agent prevents or inhibits flocculation and exerts a chelating effect on the growing crystallites during the thermal treatment to limit the crystallite size and to provide stability to the resultant sol.

The peptization is typically carried out at a temperature from about 70° C. to about 150° C. (thermal treatment) for a period of time from about 3 hours to about 3 days under agitation. It is not necessary to neutralize the solution prior to thermal treatment. Therefore, in one embodiment, the dispersion comprising the peptizing agent is not subject to neutralization step, such as by the addition of a basic solution, prior to or during the thermal treatment. It has been found useful to perform the petization in a sealed hydrothermal reactor due to the concomitant increase in pressure. Bomb-type hydrothermal reactors, such as those available from Parr Instruments, have been found suitable for use in the hydrothermal reaction. The bomb reactors may be placed in a roller oven or the like to provide the thermal conditions and to achieve agitation.

In some embodiments, the resultant sols are stable and transparent at essentially any pH (acidic, neutral, or basic) and therefore pH adjustment is not necessary. However, it is within the scope of the invention to optionally adjust pH as desired. The pH of the acid peptized sols may be adjusted by the addition of organic or inorganic base, including without limitation, tert-butylamine, diethylamine, tetramethylammonium hydroxide, ammonium hydroxide, and the like. The transparency of the sols may be observed either visually or by UV-visible spectroscopy. The stability of the sols may be measured as a function of the change in transparency over time. A "stable" sol is one which does not visibly change in transparency over a one, two, or preferably three month observation period at room temperature. It is not necessary to include a stabilizing agent, such as those described in U.S. Patent Pub. 2004/0241502, incorporated by reference herein, to impart stability to the sols according to the invention.

The particle size and crystallinity (anatase/rutile) may be determined by transmission electron microscopy (TEM) or other suitable means. The titanium dioxide crystallites will typically have an average particle size between about 1 and about 20 nm, more typically, between about 1 nm and about 10 nm, and preferably between about 1 and about 5 nm. In other embodiments, the substantially all of the titanium dioxide crystallites will have a particles sizes less than or equal to about 10 nm, and preferably less than or equal to about 5 nm. By "substantially all" is meant that the $D_{90}$ value is less than or equal to the indicated size, on a weight basis. The titanium dioxide sols will typically comprise a majority (i.e., >50%) of crystallites in the anatase form, with only a minority of the crystallites being in the rutile form. In various embodiments, at least 60%, at least 70%, at least 80%, or at least 90% of the crystallites are in the anatase crystalline form. In other embodiments, the titanium dioxide sols will be substantially free of the rutile crystalline form, by which is meant that less than 5%, preferably less than 2.5%, and more preferably less than 1% of the titanium dioxide is has the rutile crystalline form. In another embodiment, the titanium dioxide is 100% in the anatase form.

The sols will typically comprise from about 0.5 to about 20% by weight titanium dioxide based on the total weight of the composition. More typically, the sols will comprise from about 1% to about 10% by weight titanium dioxide, based on the total weight of the composition. The sols exhibit excellent transparency and stability over a wide range of pH values, including acidic, neutral, and basic conditions. In one embodiment the sols will be stable and transparent over the entirety of each of the pH ranges of 1 to <6; 6-8; and >8 to 13. Further, the pH of the sols may be adjusted from acidic to neutral to basic, and vice versa, without having a measurable impact on the transparency or stability.

The sols according to the invention may optionally include additional ingredients provided that the addition of such ingredients does not have a measurable negative impact on either the transparency or stability of the sol. For example, it is contemplated that the sols may include minor amounts of bactericidal agents, organic solvents (e.g. alcohols), film-forming aids, sequestering agents, pH adjusters, etc. In one embodiment, the sols will be free of metal ions chosen from group I-VA, and the lanthanide or actinide series of the periodic table, by which is meant that no additional amounts of such metal ions are added to the sols or intermediate preparations beyond any trace amounts which are present as impurities in the titanium starting material or other reagents.

While the sols according to the invention are transparent, it has also advantageously been found the films formed from the sols when applied to a substrate are also transparent. Included in the invention is therefore a method of forming a transparent photocatalytic de-polluting, self-cleaning film or coating on a substrate comprising applying to the substrate any of the sols according to the invention. The films are allowed to dry to a transparent coating having good adhesion to the substrate. There is essentially no limit on the nature of the substrate. Cement, metal, glass, polymeric, wood, ceramic, paper, textile, and leather substrates are each contemplated to be suitable.

The stable, transparent sols will find particular utility in any application where photocatalytic activity is desired. Due to the transparent nature of the sols, they are ideally suited for coating surfaces which are themselves transparent (i.e., glass) or for providing a coating that does not alter the appearance of the underlying substrate. Notable applications include, without limitation, photocatalytic coatings for air de-pollution on road surfaces, pavers and ceramic tiles, building exteriors, window glass, car windshields and the like. The sols will also find utility on fabrics, furniture, art works, etc., due to the self-cleaning properties to provide stainless and soil-less products as well as UV-protection.

EXAMPLE 1

A transparent titanium dioxide sol according to the invention was prepared as follows. 50 g of titanium isopropoxide (Alfa Aesar, 95%) diluted by 50 g isopropanol was added slowly to 250 g deionized water under strong agitation. After the precipitation of titanium dioxide, the agitation was maintained for about 10 more minutes. The precipitate was then filtered and washed with 500 g of deionized water. The washed, wet filter cake was redispersed in deionized water to a total weight of the dispersion of 250 g. 6 g of lactic acid (Alfa Aesar, 85% in water) was added to the dispersion and mixed well. The dispersion was charged into bomb-type hydrothermal reactors (125 ml capacity, Parr Instruments) lined with Teflon cups and lids. The bombs were then placed in a roller oven with rolling speed of 25 RPM and temperature set at 80° C. The treatment was maintained for 24 hours. After the sol cooled down to room temperature, its pH was 2.3. Tert-butylamine (Alfa Aesar, 98%) was added to the sol to adjust the pH to 7.0. The final sol product was stable and completely transparent and TEM examination revealed that it contained $\leq 5$ nm crystalline $TiO_2$ nanoparticles. Measurement of d-space on high resolution TEM images indicated that majority of the crystallites were anatase (>50%) with rutile as secondary phase (<50%).

COMPARATIVE EXAMPLE 1

A sample was prepared by the same method as for Example 1, except that 7.6 g of nitric acid (69 wt. % solution) was used as the peptizing agent instead of lactic acid. After peptization, the sol appeared stable but had a milky, non-transparent appearance.

EXAMPLE 2

The identical procedure of Example 1 was used to prepare a transparent titanium dioxide sol according to the invention, except that 4.5 g of tartaric acid (Alfa Aesar, 99%) was used instead of lactic acid as the peptizing agent. The resultant sol was stable and transparent. TEM examination revealed that it contained $\leq 5$ nm $TiO_2$ nanoparticles. High resolution TEM d-space measurement revealed that majority of the crystallites were anatase (>50%) with an unknown secondary phase (<50%) showing unusually large d-space of ~0.6 nm.

EXAMPLE 3

The identical procedure of Example 1 was used to prepare a transparent titanium dioxide sol according to the invention, except that 10.5 g of citric acid was used instead of lactic acid as the peptizing agent and the peptization treatment was maintained for three days. The resultant sol was stable and transparent. TEM examination revealed that it contained $\leq 5$ nm $TiO_2$ nanoparticles. High resolution TEM d-space measurement revealed that majority of the crystallites were anatase (>50%) with an unknown secondary phase (<50%) showing unusually large d-space of ~0.6 nm.

EXAMPLE 4

The identical procedure of Example 1 was used to prepare a transparent titanium dioxide sol according to the invention, except that 4.0 g of lactic acid was used and the peptization was carried out at 120° C. under hydrothermal conditions for 2 days. The acidic sol was neutralized to pH 8.0 with tert-butylamine. The sol product was stable and transparent. TEM images show well crystallized 5 nm $TiO_2$ nanoparticles. Measurement of d-space on high resolution TEM images indicated that majority of the crystallites were anatase (>50%) with rutile as secondary phase (<50%).

EXAMPLE 5

The identical procedure of Example 1 was used to prepare a transparent titanium dioxide sol according to the invention, except that 6.0 g of tartaric acid was used and the peptization was carried out at 120° C. under hydrothermal conditions for 2 days. The acidic sol was neutralized to pH 8.0 with tert-butylamine. The sol product was stable and transparent. TEM images show well crystallized 5 nm $TiO_2$ nanoparticles. High resolution TEM d-space measurement revealed that majority of the crystallites were anatase (>50%) with an unknown secondary phase (<50%) showing unusually large d-space of ~0.6 nm.

EXAMPLE 6

A transparent titanium dioxide sol according to the invention was prepared as follows. 50 g of titanium isopropoxide was mixed with an isopropanol solution of tartaric acid (12.5 g tartaric acid in 100 g isopropanol). To this mixture, 125 g of deionized water was slowly added under strong agitation. After hydrolysis, the agitation was maintained for 15 minutes, after which the precipitate was separated by centrifugation and the upper liquid layer was decanted off The wet solid layer was re-dispersed in water to a total weight of 250 g. It was charged in bomb reactors and treated in a roller oven at 80° C. for 3 days. The sol sample with pH about 2.0 as prepared was adjusted to pH 8.0 with tert-butylamine. It was stable and transparent.

EXAMPLE 7

This example provides a larger scale preparation of the sol of Example 5. The sample was same as used in Example 5, except that instead of 125 ml bombs, a two liter hydrothermal reactor equipped with a heater, a Teflon liner and a magnet drive stirrer was used for the sample preparation. With this reactor, a sample of about 1.5 kg was obtained in each batch. The appearance, properties and photocatalytic performance were substantially the same as Example 5.

EXAMPLE 8

In this example, titanium oxysulfate ($TiOSO_4$) was used as $TiO_2$ precursor and precipitation of $TiO_2$ was affected by pH adjustment with an ammonia solution. 950 g of titanium oxysulfate solution in water (7.9% based on $TiO_2$ analysis, Millennium Inorganic Chemicals) was added at 25 ml/min to a 4 L beaker containing 950 g of deionized water. Simultaneously, the ammonia solution (29%) was added to the beaker at a rate that maintained the pH of the reaction mixture at about 8.0 throughout the precipitation process. The precipitate was stirred for another 30 minutes before it was filtered and washed with 5 L of deionized water. The washed, wet precipitate was then redispersed with deionized water to a total weight of the dispersion about 1,400 g. 45 g of tartaric acid was added to the dispersion with stirring and the dispersion was charged in the 2 L hydrothermal reactor described in Example 7. It was treated hydrothermally at 120° C. for 2 days. A transparent $TiO_2$ sol was obtained with appearance and properties similar to the sample described in Example 5.

EXAMPLE 9

To investigate the photocatalytic activity of coatings prepared from the sols according to the invention, the sols of Examples 2, 4, 5, and 8 were deposited as thin layers on concrete substrates (about 0.3 ml of sol on an 18 $cm^2$ area) to give Samples A, B, C, and D, respectively. The activity against NOx pollutants under UV radiation (2 $W/m^2$) was measured at various intervals over a period of about 4,000 hours. The methodology for determining NOx reduction was substantially as described in U.S. Patent Pub. 2007/0167551, the disclosure of which is hereby incorporated by reference. As shown in FIG. 1, each of the samples showed substantial (i.e., greater than about 15%) photocatalytic activity, expressed as % NOx removal, over the entire time period. Interestingly, samples A, B, and C, which were prepared by hydrolysis of titanium isopropoxide, exhibited increasing % NOx removal over time, whereas sample D, which was prepared by pH induced precipitation from titanium oxysulfate ($TiOSO_4$), showed extremely high (e.g., between about 50% and about 75%) initial % NOx removal up to about 1,500 hours with a gradual leveling off above about 45% NOx removal.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:
1. A method for preparing a stable, transparent photocatalytic titanium dioxide sol, comprising:
   (i) providing a solution comprising a titanium containing compound;

(ii) precipitating hydrous titanium dioxide from said solution of a titanium containing compound and recovering and washing said precipitated hydrous titanium dioxide with deionized water;

(iii) forming an aqueous dispersion of said precipitated hydrous titanium dioxide;

(iv) mixing said aqueous dispersion in the presence of one or more alpha-hydroxy carboxylic acids at a temperature between about 70° C. and about 150° C. in a hydrothermal reaction zone for a period of time between about three hours and about 3 days; with the proviso that said one or more alpha-hydroxy carboxylic acids are essentially free of glycolic acid;

thereby providing a sol of titanium dioxide which is stable and transparent at every pH throughout the pH range of 2 to 12; said sol comprising crystallites of titanium dioxide having an average particle size of less than about 10 nm, the majority of said crystallites being in anatase form.

2. The method of claim 1, wherein said titanium containing compound is selected from the group consisting of titanium alkoxide, titanium oxychloride, titanyl sulfate, and titanyl acetylacetonate.

3. The method of claim 2, wherein said titanium containing compound is titanium isopropoxide.

4. The method of claim 1, wherein said one or more alpha-hydroxy carboxylic acids include an alpha-hydroxy carboxylic acid selected from the group consisting of lactic acid, tartaric acid, malic acid, citric acid, and combinations thereof.

5. The method of claim 4, wherein said one or more alpha-hydroxy carboxylic acids include lactic acid.

6. The method of claim 4, wherein said one or more alpha-hydroxy carboxylic acids include tartaric acid.

7. The method of claim 4, wherein said one or more alpha-hydroxy carboxylic acids include citric acid.

8. The method of claim 1, wherein step (iv) is carried out without an intervening neutralization step between steps (iii) and (iv).

9. The method of claim 1, further comprising the step of neutralizing the resultant sol with a base.

10. The method of claim 1, wherein said sol comprises titanium dioxide crystallites having an average particle size of less than about 5 nm.

11. The method of claim 1, wherein said sol comprises titanium dioxide crystallites, at least 90% of which are in the anatase form.

12. A method for preparing a stable, transparent photocatalytic titanium dioxide sol, comprising:

providing a solution comprising a titanium containing compound;

(ii) precipitating hydrous titanium dioxide from said solution of a titanium containing compound and recovering and washing said precipitated hydrous titanium dioxide with deionized water;

(iii) forming an aqueous dispersion of said precipitated hydrous titanium dioxide;

(iv) mixing said aqueous dispersion in the presence of one or more alpha-hydroxy carboxylic acids at a temperature between about 70° C. and about 150° C. in a hydrothermal reaction zone for a period of time between about three hours and about 3 days;

thereby providing a sol of titanium dioxide which is stable and transparent at every pH throughout the pH range of 2 to 12; said sol comprising crystallites of titanium dioxide having an average particle size of less than about 10 nm, the majority of said crystallites being in anatase form;

with the proviso that step (iv) is carried out without an intervening neutralization step between steps (iii) and (iv).

13. The method of claim 12, wherein said titanium containing compound is selected from the group consisting of titanium alkoxide. titanium oxychloride titanyl sulfate and titanyl acetylacetonate.

14. The method of claim 13, wherein said titanium containing compound is titanium isopropoxide.

15. The method of claim 12, wherein said one or more alpha-hydroxy carboxylic acids include an alpha-hydroxy carboxylic acid selected from the group consisting of lactic acid, tartaric acid, malic acid, citric acid, and combinations thereof.

16. The method of claim 15, wherein said one or more alpha-hydroxy carboxylic acids include lactic acid.

17. The method of claim 15, wherein said one or more alpha-hydroxy carboxylic acids include tartaric acid.

18. The method of claim 15, wherein said one or more alpha-hydroxy carboxylic acids include citric acid.

19. The method of claim 12, wherein said one or more alpha-hydroxy carboxylic acids are essentially free of glycolic acid.

20. The method of claim 12, further comprising the step of neutralizing the resultant sol with a base.

21. The method of claim 12, wherein said sol comprises titanium dioxide crystallites having an average particle size of less than about 5 nm.

22. The method of claim 12, wherein said sol comprises titanium dioxide crystallites, at least 90% of which are in the anatase form.

23. A stable, transparent sol comprising from about 1 to about 10% by weight photocatalytic titanium dioxide particles having an average crystallite size between about 1 nm and about 10 nm, the majority of said crystallites being in the anatase form, wherein said sol is both stable and transparent at acidic, neutral, and basic pH.

24. The stable, transparent sol of claim 23, wherein said titanium dioxide crystallites have an average particle size between about 1 nm and about 5 nm.

25. The stable, transparent sol of claim 23, wherein at least 90% of said crystallites are in the anatase form.

* * * * *